US009710691B1

(12) United States Patent
Hatcher et al.

(10) Patent No.: US 9,710,691 B1
(45) Date of Patent: Jul. 18, 2017

(54) TOUCHLESS FINGERPRINT MATCHING SYSTEMS AND METHODS

(71) Applicants: Charles Hatcher, Trussville, AL (US); William Caleb Lucas, Birmingham, AL (US)

(72) Inventors: Charles Hatcher, Trussville, AL (US); William Caleb Lucas, Birmingham, AL (US)

(73) Assignee: Diamond Fortress Technologies, Inc., Hoover, AL (US)

( * ) Notice: Subject to any disclaimer, the term of this patent is extended or adjusted under 35 U.S.C. 154(b) by 0 days.

(21) Appl. No.: 14/604,454

(22) Filed: Jan. 23, 2015

Related U.S. Application Data

(60) Provisional application No. 61/930,832, filed on Jan. 23, 2014, provisional application No. 62/023,640, filed on Jul. 11, 2014.

(51) Int. Cl.
*G06K 9/00* (2006.01)

(52) U.S. Cl.
CPC ..... *G06K 9/00033* (2013.01); *G06K 9/00073* (2013.01); *G06K 9/00093* (2013.01)

(58) Field of Classification Search
CPC .................................... G06K 9/00006–9/0012
See application file for complete search history.

(56) References Cited

U.S. PATENT DOCUMENTS

| 5,351,304 | A | * | 9/1994 | Yamamoto | G07C 9/00158 382/125 |
| 5,909,501 | A | * | 6/1999 | Thebaud | G06K 9/00067 382/124 |
| 5,937,082 | A | * | 8/1999 | Funada | G06K 9/00067 382/125 |
| 6,111,978 | A | | 8/2000 | Bolle et al. | |
| 6,744,910 | B1 | * | 6/2004 | McClurg | G06K 9/00013 340/5.53 |
| 7,020,591 | B1 | * | 3/2006 | Wei | G06K 9/00885 382/190 |

(Continued)

OTHER PUBLICATIONS

Kim et al., "New Enhancement Algorithm for Fingerprint Images", IEEE, 2002.*

(Continued)

*Primary Examiner* — Aaron W Carter
(74) *Attorney, Agent, or Firm* — Maynard Cooper & Gale, P.C.; Jon E. Holland

(57) ABSTRACT

In order to authenticate a user of an electronic device, an image of the user's fingerprint is captured. Before feature information is extracted, the fingerprint image is enhanced via localized normalization thereby increasing contrast within the fingerprint image. Thereafter, feature information, such as key point data, is extracted from the image and compared to a predefined template to determine whether the feature information matches the template. If so, the user is authenticated. By enhancing the quality of the fingerprint image through localized normalization and other techniques, the reliability of the matching operation is significantly enhanced. In addition, using key point comparisons for assessing similarity between the feature information and the template helps to address inconsistencies relating to finger rotation, scale, and translation during capture.

12 Claims, 8 Drawing Sheets

(56) References Cited

U.S. PATENT DOCUMENTS

| | | | |
|---|---|---|---|
| 7,194,393 B2* | 3/2007 | Wei | G06K 9/00885 382/190 |
| 7,327,859 B1* | 2/2008 | Chau | G06K 9/00046 382/116 |
| 9,165,177 B2* | 10/2015 | Burcham | G06K 9/00033 |
| 2002/0126883 A1* | 9/2002 | Senior | G06K 9/00067 382/125 |
| 2003/0076986 A1* | 4/2003 | Yoon | G06K 9/00067 382/125 |
| 2003/0215118 A1* | 11/2003 | Riff | G06K 9/00067 382/124 |
| 2004/0062427 A1* | 4/2004 | Biswas | G06K 9/00006 382/125 |
| 2004/0228506 A1* | 11/2004 | Haddad | G06K 9/00013 382/124 |
| 2004/0239648 A1* | 12/2004 | Abdallah | G06F 21/32 345/173 |
| 2004/0255168 A1 | 12/2004 | Murashita et al. | |
| 2006/0115131 A1* | 6/2006 | Wei | G06K 9/00885 382/125 |
| 2006/0233427 A1* | 10/2006 | Hauke | G06K 9/00033 382/124 |
| 2007/0230754 A1* | 10/2007 | Jain | G06K 9/00093 382/125 |
| 2007/0297653 A1* | 12/2007 | Bolle | G06K 9/00073 382/124 |
| 2009/0161964 A1 | 6/2009 | Tzur | |
| 2009/0245597 A1* | 10/2009 | Toyama | G06K 9/001 382/125 |
| 2009/0268323 A1 | 10/2009 | Leong | |
| 2010/0315498 A1* | 12/2010 | Choi | G06K 9/00033 348/77 |
| 2010/0322484 A1* | 12/2010 | Hama | G06F 21/32 382/115 |
| 2011/0064282 A1* | 3/2011 | Abramovich | G06K 9/00033 382/124 |
| 2011/0216948 A1* | 9/2011 | Yalla | G06K 9/00006 382/125 |
| 2012/0016798 A1 | 1/2012 | Carper | |
| 2012/0076369 A1* | 3/2012 | Abramovich | G06K 9/00033 382/124 |
| 2012/0086794 A1* | 4/2012 | Burcham | G06K 9/036 348/77 |
| 2012/0105586 A1* | 5/2012 | Miesak | G06K 9/00013 348/46 |
| 2012/0250947 A1* | 10/2012 | Abramovich | G06K 9/00026 382/115 |
| 2014/0212008 A1* | 7/2014 | Hatcher, II | G06K 9/22 382/124 |
| 2015/0098013 A1* | 4/2015 | Gray | G02F 1/09 348/369 |
| 2015/0110367 A1* | 4/2015 | Kumar | G06K 9/00087 382/124 |
| 2015/0130917 A1* | 5/2015 | Mil'shtein | G06K 9/00033 348/77 |
| 2015/0146943 A1* | 5/2015 | Son | G06K 9/00033 382/124 |
| 2015/0169934 A1* | 6/2015 | Tsai | G06K 9/00033 382/115 |
| 2015/0227774 A1* | 8/2015 | Balch | G06K 9/6202 382/124 |
| 2015/0294131 A1* | 10/2015 | Neskovic | G06K 9/00026 382/125 |
| 2016/0210493 A1* | 7/2016 | Walch | G06K 9/00013 |

OTHER PUBLICATIONS

Chikkerur, et al., "A Systematic Approach for Feature Extraction in Fingerprint Images," Center for Unified Biometrics and Sensors (CUBS), University of Buffalo, pp. 1-7, 2004.

Rosten, et al., "Machine learning for high-speed corner detection," Department of Engineering, Cambridge University, UK, pp. 1-14, 2006.

Rublee, et al, "ORB: an efficient alternative to SIFT or SURF," Willow Garage, pp. 1-8, 2011.

Kukharev, et al, "Visitor Identification—Elaborating Real Time Face Recognition System," Technical University of Szczecin, Faculty of Computer Science and Information Technology, pp. 1-8, 2004.

Malathi, S., and C. Meena, "Partial fingerprint matching based on SIFT features." International Journal on Computer Science and Engineering 2, No. 04 (2010): 1411-1414.

Hiew, Bee Yan, Andrew Beng Jin Teoh, and Ooi Shih Yin, "A secure digital camera based fingerprint verification system." Journal of Visual Communication and Image Representation 21, No. 3 (2010): 219-231.

Zhou, Ru, SangWoo Sin, Dongju Li, Tsuyoshi Isshiki, and Hiroaki Kunieda, "Adaptive sift-based algorithm for specific fingerprint verification," in Hand-Based Biometrics (ICHB), 2011 International Conference on, pp. 1-6, IEEE, 2011.

Feng, Jianjiang, "Combining minutiae descriptors for fingerprint matching," Pattern Recognition 41, No. 1 (2008): 342-352.

Swiss Federal Institute of Technology Lausanne, Biomedical Imaging Group, "Local Normalization," Imaging Web Demonstration, Feb. 11, 2002, http://bigwww.epfl.ch/demo/jlocalnormalization/.

Lucas, U.S. Appl. No. 14/213,496, entitled, "Touchless Fingerprint Matching Systems and Methods," filed Mar. 14, 2014.

Hiew, B. Y., Andrew BJ Teoh, and Y. H. Pang, "Digital camera based fingerprint recognition," In Telecommunications and Malaysia International Conference on Communications, 2007. ICT-MICC 2007. IEEE International Conference on, pp. 676-681. IEEE, 2007.

Dadgostar, M., Pooneh R. Tabrizi, Emad Fatemizadeh, and Hamid Soltanian-Zadeh, "Feature Extraction Using Gabor-Filter and Recursive Fisher Linear Discriminant with Application in Fingerprint Identification," In Advances in Patter Recognition, 2009, ICAPR'09, Seventh International Conference on, pp. 217-220, IEEE, 2009.

* cited by examiner

TOUCHLESS FINGERPRINT MATCHING SYSTEMS AND METHODS

CROSS REFERENCE TO RELATED APPLICATIONS

This application claims priority to U.S. Provisional Application No. 61/930,832, entitled "Contactless Fingerprint Biometric Sensing Systems and Methods" and filed on Jan. 23, 2014, which is incorporated herein by reference, and U.S. Provisional Application No. 62/023,640, entitled "Touchless Fingerprint Matching Systems and Methods" and filed on Jul. 11, 2014, which is incorporated herein by reference.

RELATED ART

Data security is an important concern for mobile electronic devices, such as cellular telephones (e.g., iPhone®), laptop computers, tablet computers (e.g., iPad®), and personal digital assistants (PDAs). Such devices are often protected from unauthorized use through the use of password authentication. In this regard, before allowing a user to operate the device or an application on the device, the user is typically prompted for a password that must match a previously-stored password. If the passwords do not match, then the user is prevented from accessing electronic information or applications contained in the device until a matching password is successfully entered.

Password authentication has several drawbacks making its use less than ideal for many users. In this regard, a password is vulnerable to hackers who may improperly learn of a user's valid password in a number of ways thereby compromising the security of the information contained in the mobile device. Also, an authorized user is required to remember his password and may be undesirably prevented from accessing information or applications in the mobile device if he forgets his password. In addition, entering a password each time the user wishes to access sensitive information or applications is somewhat burdensome.

To address many of these drawbacks, other authentication techniques have been developed such as fingerprint authentication. In fingerprint authentication, an image of a user's finger is electronically captured to provide a fingerprint image that can be compared to a previously-stored template in order to authenticate the user. Fingerprint authentication is less vulnerable to hacking relative to other forms of authentication, such as password authentication, and can be more convenient for users. For example, a user may find that capturing an image of his finger is less burdensome than remembering and entering a password as is required for password authentication.

Unfortunately, fingerprint authentication has previously been plagued by performance issues that have prevented its widespread acceptance in the market, particularly for mobile devices. As an example, the face of a mobile device can be difficult to keep clean. If a user places his finger on the surface of a mobile device for image capture, the user's finger often leaves an oily residue that may adversely affect the quality of images captured in the future if the surface is not adequately cleaned. Also, during image capture, a user may press on the surface of the mobile device differently relative to other image captures, such that the user's fingerprint image is not consistent.

Touchless fingerprint authentication can alleviate several of the performance issues described above. In touchless fingerprint authentication, the user does not press his finger on a surface of the mobile device but rather positions his finger some distance away from the device's camera during image capture. Thus, the user's finger is not deformed during image capture since it is not pressed against a surface of the device helping to provide more consistent fingerprint images. Further, since the finger being imaged does not contact the device's surface, there is no oily residue that would otherwise affect future images captured by the device's camera.

However, touchless fingerprint authentication suffers from other drawbacks that make reliable matching difficult. Specifically, because the user's finger is not pressed against the surface of the mobile device, the lighting across the user's finger during capture may vary, depending on the lighting environment in which the image capture is occurring, thereby affecting the intensities and contrast measured by the mobile device. Further, the user's finger is likely to be positioned at different distances from the camera such that the depth of field varies from one image to the next. This variance in the depth of field makes it difficult to consistently capture a high quality image for matching purposes. In addition, the user's finger may be rotated from one image to the next making it difficult to consistently match fingerprint images of the same finger. Also, many fingerprint authentication algorithms are processing intensive, and the processing resources on many mobile devices are often limited.

Thus, a heretofore unaddressed need exists for improved fingerprint authentication techniques for addressing many of the drawbacks currently plaguing the performance and reliability of conventional fingerprint authentication algorithms.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to touchless fingerprint matching for use in fingerprint authentication. In order to authenticate a user of an electronic device, an image of the user's fingerprint is captured. Before feature information is extracted, the fingerprint image is enhanced via localized normalization thereby increasing contrast within the fingerprint image. Thereafter, feature information, such as key point data, is extracted from the image and compared to a predefined template to determine whether the feature information matches the template. If so, the user is authenticated. By enhancing the quality of the fingerprint image through localized normalization and other techniques, the reliability of the matching operation is significantly enhanced. In addition, using key point comparisons for assessing similarity between the feature information and the template helps to address inconsistencies relating to finger rotation, scale, and translation during capture.

Figure 1:
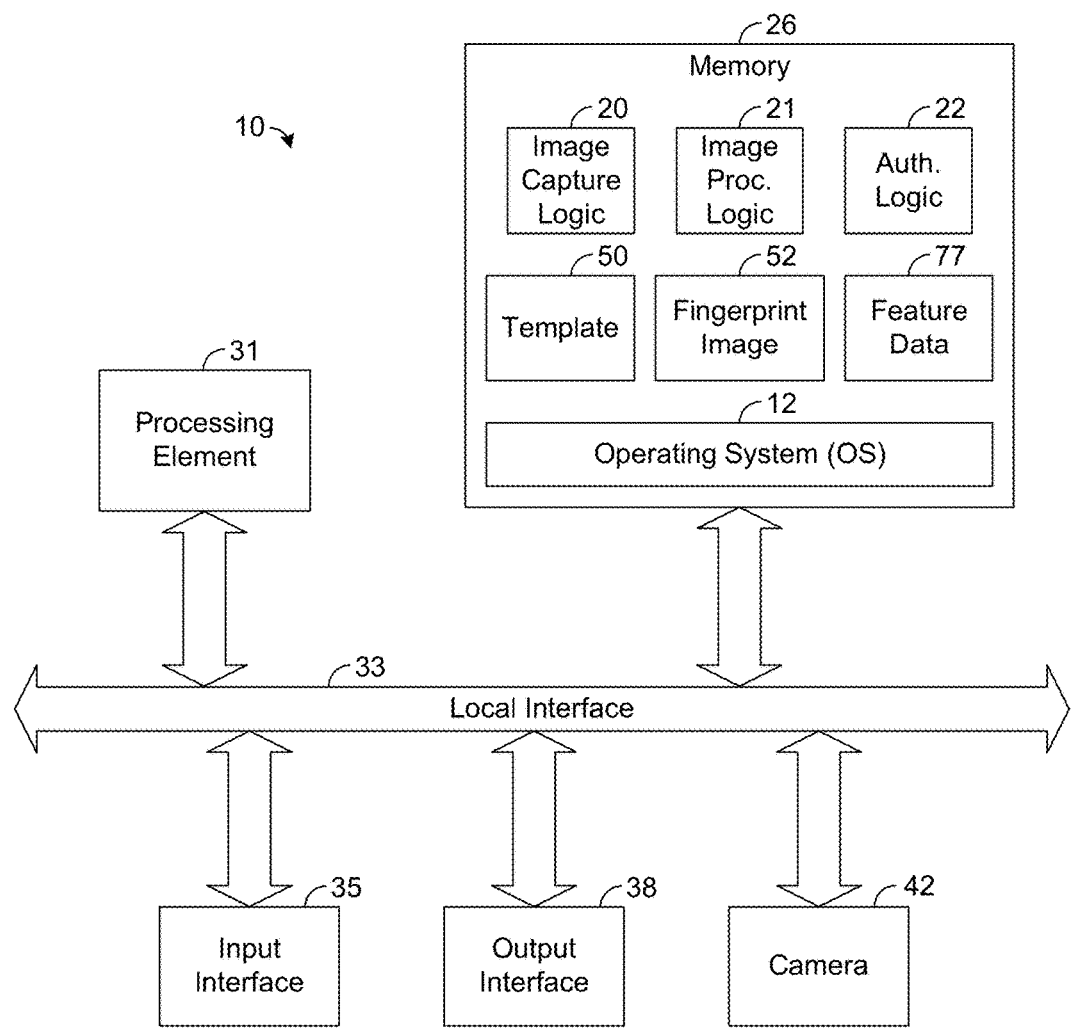
FIG. 1 is a block diagram illustrating an exemplary embodiment of an electronic device for performing touchless fingerprint authentication.

FIG. 1 depicts an exemplary embodiment of an electronic device 10 that is configured to perform touchless fingerprint authentication, as will be described in more detail hereafter. As an example, the electronic device 10 may be a mobile device, such as a cellular telephone, laptop computer, table computer, PDA, or any other mobile electronic device having resources, such as applications or sensitive data, for which access is to be restricted. In other embodiments, it is unnecessary for the device 10 to be mobile. As an example, the electronic device 10 may be a desktop computer or a wall-mounted security device for controlling access (e.g., controlling door locks) to rooms or certain restricted areas.

As shown by FIG. 1, the device 10 has an operating system 12 that is implemented in software or firmware for generally controlling and managing resources of the device 10. The device 10 also has image capture logic 20, image processing logic 21, and authentication logic 22 for generally capturing one or more fingerprint images and authenticating at least one user based on the captured fingerprint images, as will be described in more detail hereafter. The image capture logic 20, the image processing logic, and the authentication logic 22 can be implemented in software, hardware, firmware or any combination thereof. In the exemplary embodiment illustrated by FIG. 1, the image capture logic 20, the image processing logic 21, and the authentication logic 22 are implemented in software and stored in memory 26 of the device 10.

Note that the image capture logic 20, the image processing logic 21, and the authentication logic 22, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary device 10 depicted by FIG. 1 comprises at least one conventional processing element 31, such as a digital signal processor (DSP) or a central processing unit (CPU), that communicates to and drives the other elements within the device 10 via a local interface 33, which can include at least one bus. As an example, the processing element is configured to retrieve and execute instructions of software stored in memory 26. Furthermore, an input interface 35, for example, a keyboard, a keypad, or a mouse, can be used to input data from a user of the device 10, and an output interface 38, for example, a printer, monitor, liquid crystal display (LCD), or other display apparatus, can be used to output data to the user. In one exemplary embodiment, the device 10 has a touchscreen, which can be used to implement the input interface 35 and the output interface 38. In this regard, the touchscreen is configured to display information to the user and also accept inputs from the user, via capacitive sensing or otherwise, when the user touches the touchscreen. As shown by FIG. 1, the device 10 also has a camera 42 for capturing images, as will be described in more detail below.

Note that the device 10 may have components and resources not specifically shown in FIG. 1. For example, when the device 10 is implemented as a cellular telephone, the device 10 may have a microphone for converting sounds (e.g., speech) into digital data and a speaker for converting digital data into sound. The device 10 may also have a transceiver and an antenna for wirelessly communicating data (e.g., cellular signals).

At certain times, such as after power up or after a user has submitted an input indicating a desire to access a particular resource, such as sensitive data or applications stored in the device 10, the device 10 is configured to authenticate the user before permitting the user access to the resource. In this regard, the image capture logic 20 is configured to capture a fingerprint image of the user, and the image processing logic 21 is configured to process the captured image in order to improve and enhance image quality and contrast within the image. The image processing logic 21 is also configured to extract feature descriptors indicative of the user's fingerprint. The authentication logic 22 is configured to then compare data defining the feature descriptors to a template 50 that is indicative of the fingerprint of an authorized user. In this regard, the authentication logic 22 is configured to determine whether there is a sufficient correlation between the feature descriptors extracted from the captured fingerprint image and the template 50 such that the identity of the user from which the fingerprint image was captured is deemed to match the identity of the user from which the template 50 was originally derived. In particular, the authentication logic 22 determines a score, referred to herein as "correlation score," indicating the extent to which the feature descriptors from the processed fingerprint image correlates with the template 50. In general, the more similar the feature descriptors are to the template 50, the higher is the correlation score.

If the correlation score exceeds a predefined threshold, then the data defining the feature descriptors is deemed to "match" the template 50 such that the user is deemed to be authenticated as an authorized user of the device 10. In this regard, matching of the data defining the feature descriptors to the template 50 indicates that the newly-acquired fingerprint image is sufficiently similar to ("matches") the fingerprint image from which the template 50 was derived such that the user can be deemed to be the same person who provided the template 50. In such case, the device 10 (e.g., operating system 12) permits the user to access resources of the device 10 that would otherwise be restricted from access or use. As an example, the operating system 12 may permit the user to run an application (not shown) or view sensitive data that the user otherwise would not be permitted to access in the absence of a matching fingerprint image.

Figure 2:
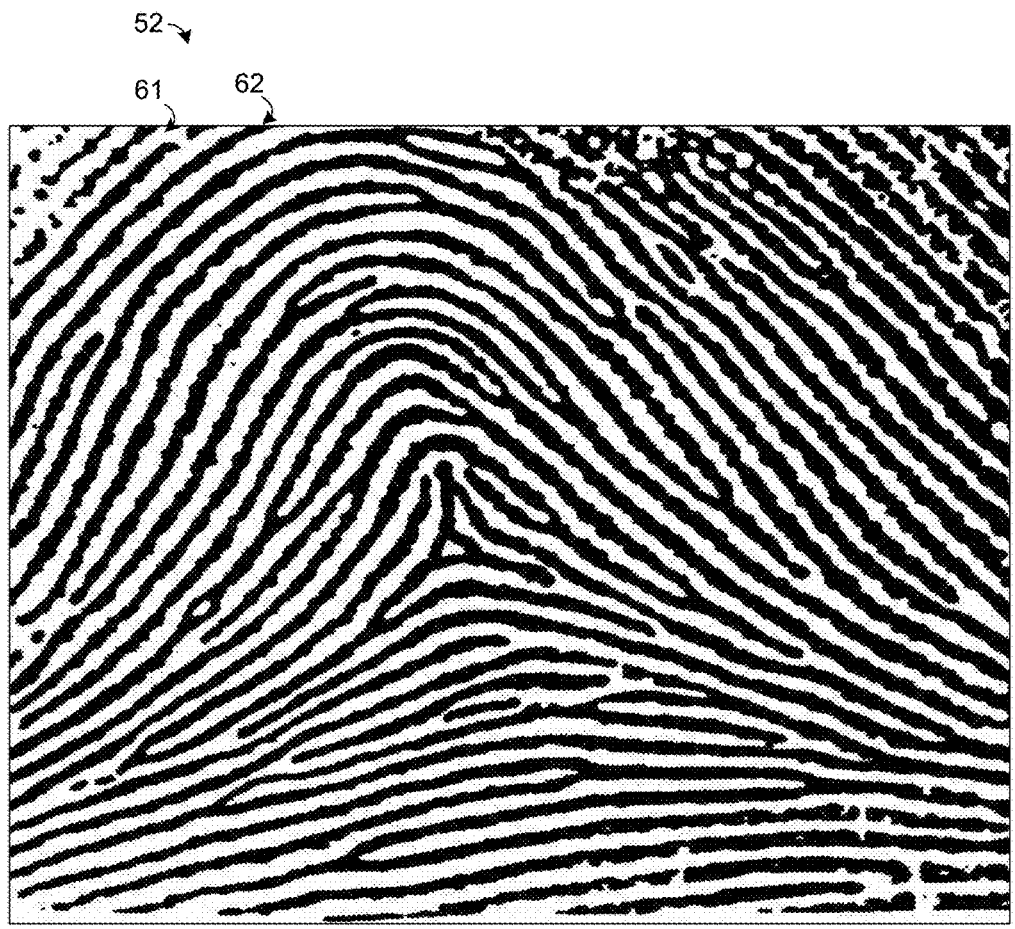
FIG. 2 depicts an exemplary fingerprint image captured by the electronic device depicted by FIG. 1.

Note that the template 50 is defined during a registration phase in which an authorized user provides a fingerprint image. In this regard, the user places a finger some distance (e.g., about four to six inches, though other distances are possible) away from the camera 42 (where the finger 10 is in free space and, specifically, is not touching the device 10) and provides an input via the input interface 35 indicating that the user is ready for the device 10 to capture an image of his fingerprint. In response, the image capture logic 20 controls the camera 42 such that it captures an image of the user's fingerprint. The image capture logic 20 is configured to filter and analyze the image in order to locate the user's fingertip within the image. The image capture logic 20 then crops the image so that the remaining image is entirely that of the user's fingerprint. FIG. 2 depicts an exemplary cropped fingerprint image 52.

Note that the fingerprint image 52 is defined by pixel data, as is known in the art. In this regard, the fingerprint image 52 is defined by rows and columns of pixels in which each pixel represents a discrete area of the image 52. Each pixel has a color value and an intensity value indicating the color and intensity, respectively, for the discrete area represented by the pixel.

As illustrated by FIG. 2, the fingerprint image 52 is characterized by ridges 61 (indicated as white in FIG. 2) and valleys 62 (indicated at black in FIG. 2), which are arranged in a pattern unique to the user from which the image 52 was captured. The captured image 52 is processed by the image processing logic 21 (FIG. 1) in order to enhance the quality of the image 52 and to extract feature descriptors that can be used to define the template 50, as will be described in more detail below.

Exemplary techniques for capturing the image 52 are described in U.S. Provisional Patent Application No. 61/930,832, which is incorporated herein by reference. There are several functions that the image capture logic 20 performs in order to facilitate capturing of a high-quality image for processing by the image processing logic 21 and the authentication logic 22. As an example, it is well known for a camera to have an autofocus function for automatically focusing a lens of the camera on the scene that is within the camera's view. Such a conventional autofocus function may be used by the camera 42 when acquiring images. However, the parameters used by typical autofocus functions are not usually optimized for focusing on fingers that are positioned a short distance from the camera lens and, specifically, for focusing on the tiny ridges and valleys that define a fingerprint. Thus, often an autofocus function may result in images for which the ridges and valleys are not in focus, thereby adversely affecting the quality of the images captured by the image capture logic 20 for fingerprint analysis.

In one embodiment, the image capture logic 20 is configured to analyze images from a video feed received from the camera 42 in order to determine when an image of a fingerprint is in focus and to then initiate a capture of the image in response to such determination. Thus, at the time of image capture, the video image should be sufficiently in focus to provide a high-quality image for processing. Exemplary techniques for determining when to initiate image capture will now be described in more detail.

As described above, a user may place a finger in front of the camera 42 a short distance from the camera lens and then provide an input indicating that he or she is ready for an image of his finger to be captured for authentication purposes. In response, rather than immediately capturing an image from the camera 42 for fingerprint analysis, the image capture logic 20 instead begins to analyze the frames of the video feed from the camera 42 in order to determine when an in-focus image of a fingerprint is within the frame. Once such an image is found, the image capture logic 20 captures (e.g., stores) such image for processing by the image processing logic 21.

As further described herein, during image capture, the video feed from the camera is rendered to the output interface 38 so that the user can view the video feed, which should be depicting an image of the user's finger that is positioned in front of the camera lens. Graphical alignment elements may be displayed on the rendered images to assist the user in aligning his finger with the camera lens. Based on such techniques, it is assumed for proper image capture that the user's finger will be located at the center of the frames being analyzed. In one exemplary embodiment, the image capture logic 20, for each frame, analyzes a small window that is centered about the center of the image received by the camera 42. As an example, the size of the window may be about 10% of the overall size of the image being analyzed. Having a smaller-sized window helps to reduce the processing burden on the resources of the device 10. In addition, if the user's finger in indeed aligned with the camera lens, then it is likely that entire portion of the window depicts a portion of the user's finger.

Note that the window may be centered about other points in other embodiments. The location of the window is preferably controlled such that it is within the image of the user's finger. In the instant embodiment, the window is positioned at a predefined location within the captured image and at least one graphical alignment element is used in an effort to ensure that the user's finger is appropriately positioned such that the window is within the boundaries of the depicted fingerprint. In other embodiments, other techniques for positioning the window are possible.

Figure 3:
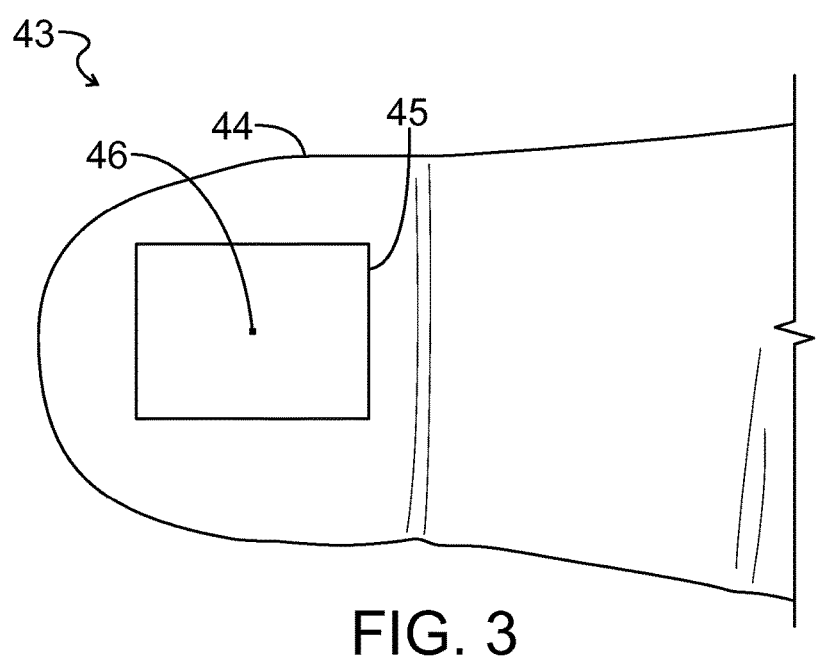
FIG. 3 depicts an exemplary fingerprint image captured and cropped by the electronic device depicted by FIG. 1 before processing of the fingerprint image.

To better illustrate the foregoing, refer to FIG. 3, which depicts an exemplary image 43 of a frame of the video feed received from the camera 42 during image capture. Within such frame, is an image 44 of the user's finger. As shown by FIG. 3 a small window 45 is shown centered about the center 46 of the image 43. Such a window 45 is not actually visible in the image 43 but is shown in FIG. 3 for illustrative purposes. As shown by FIG. 3, if the user's finger is indeed aligned with the camera lens, then the window 45 should fit entirely within the finger image 44 such that each pixel of the window 45 is indicative of the intensity of light from a discrete region of the user's finger. In analyzing the image 43 for determining whether it is in focus, the image capture logic 20 analyzes the pixels within the window 45, as will be described in more detail hereafter.

In this regard, the image capture logic 20 is configured to measure the contrast of the image defined by the window 45 to determine a value, referred to hereafter as "contrast value," indicative of such contrast. As an example, the image capture logic 20 may apply a Laplacian function on the pixel values of the window 45 to determine the contrast value. Techniques for measuring contrast of a digital image via Laplacian functions or otherwise are generally well known and may be used to determine the foregoing contrast value. For illustrative purposes, it will be assumed hereafter that a higher contrast value indicates a higher measurement of contrast within the window 45 and a lower contrast value indicates a lower measurement of contrast within the window 45, but other types of contrast values are possible.

The image capture logic 20 is configured to compare the contrast value to a threshold. If the contrast value is below the threshold, the image capture logic 20 is configured to determine that the image 43 is not in focus and thus refrain from capturing the image for authentication purposes. In such case, the image capture logic 20 does not retain the image 43 or provide the image 43 to the image processing logic 21 for processing. In addition, the image capture logic 20 repeats the aforementioned process until an image is found that is in focus.

If the contrast value is above the threshold, the image capture logic 20 captures the image for authentication purposes. In such case, the image capture logic 20 stores the fingerprint image 43 in memory 26 so that it is available for processing by the image processing logic 21, as will be described in more detail. Accordingly, once an input is received indicating that an image is to be captured, the image capture logic 20 waits for an image 43 in which the window 46 is in focus and then captures such image for processing by the image processing logic 21.

In one exemplary embodiment, the image capture logic 20 is also configured to analyze the image 43 in an effort to detect a presence of the finger image 44 and to initiate a capture of the image 43 for authentication when the logic 20 detects (1) a focused image, as described above, and (2) a presence of the finger image 44. There are various techniques that can be used to detect a presence of the finger image 44, and exemplary techniques are described in more detail below.

In this regard, it is expected that the user's finger will appear as a relatively bright object within the image 43. Specifically, the user's finger is relatively close to the lens of the camera 42 and is highly reflective relative to other objects that may appear in the image 43. In addition, a light source (not shown) on the device 10 may be activated during image capture so that it illuminates the user's finger when it is aligned with the lens of the camera 42. In view of the relative brightness of the user's finger, the image capture logic 20 is configured to filter the image 43 in order to remove objects having a brightness below a threshold. As an example, the logic 20 may calculate the standard deviation of the intensity values defined for the image 43 and use the standard deviation as a threshold for determining which pixels to remove. Specifically, if the intensity value of a pixel is below the threshold, the pixel is masked out. The result should be an image 43 having discrete regions, referred to as "bright spots," where each bright spot is defined by a set of contiguous pixels having intensity values above a threshold.

In one exemplary embodiment, the filtering is based on color value in addition to or in lieu of brightness. In this regard, the logic 20 is configured to search the pixels and to mask out pixels having a color value outside of a predefined range, and such range is defined to include likely skin colors. Specifically, pixels having a color value outside of the range (indicating that the pixel likely does not represent an image of a person's skin) are masked out. Accordingly, assuming that the image 43 is filtered based on both brightness and skin color, the bright spots that remain after the filtering define sets of contiguous pixels having intensity values above a threshold and color values within a predefined range indicative of skin color.

After performing the foregoing filtering operation, the image capture logic 20 is configured to perform shape detection in an effort to detect a shape corresponding to an image of the user's finger. In particular, there are various known shape detectors that are capable of detecting certain shapes. As an example, one known shape detector employs a Hue transform in order to detect certain shapes, such as lines and circles. Noting that the end of the user's finger is semi-circular, such a shape detector can be used to detect a circular object representing the user's finger. Thus, the logic 20 analyzes each bright spot of the filtered image 43 in order to determine whether it has a contour corresponding to a circular object. If the logic 20 detects a circular object near the center of the image 43 and if the logic 20 determines that the image 43 is in focus based on a contrast measurement, as described above, then the logic 20 determines that the image 43 received from the camera 42 likely has an in focus image 44 of the user's finger. In such case, the logic 20 captures the image 43 for processing by the image processing logic 21, as will be described in more detail below. In other embodiments, other techniques can be used to determine whether the image 43 received from the camera 42 is in focus and/or whether it likely includes an image 44 of a user's finger. However, the exemplary techniques described herein have various advantages, including enabling the image capture logic 20 to quickly determine whether to capture an image received from the video feed without overburdening the processing resources of the device 10. In fact, the exemplary techniques described herein are suitable for use on many conventional mobile device platforms, including cellular telephones.

Note that, in one exemplary embodiment, the image capture logic 20 crops the image 43 before processing by the image processing logic 21 in order to provide a cropped image 52 in which the entire image 52 depicts a portion of the user's finger, as shown by FIG. 2. In one exemplary embodiment, it is assumed that the user's finger is aligned with the camera lens such that the user's finger is located within a specific region of the image 43. In such an embodiment, the image capture logic 20 may be configured to crop a predefined area of the image, such as a window of a predefined size that is centered about the image center 46. In other embodiments, the image capture logic 20 is configured to analyze the image 43 in order to locate the boundaries of the finger image 44 and to perform the cropping such that the cropped image 52 is within this boundary. Various other techniques for cropping the image 43 are possible in yet other embodiments.

In addition, the image processing logic 21 is configured to digitally enhance the fingerprint image 52 by filtering and normalizing the image 52 using conventional filtering and normalization algorithms in an effort to improve the contrast within the image 52. In this regard, many conventional normalization algorithms calculate the standard deviation and mean of a given set of values (e.g., intensity values) of an image and adjust each individual intensity value based on the standard deviation and mean calculated by the algorithm.

In touchless fingerprint authentication, the imaged finger is likely illuminated by light at varying brightness across the width of the finger. In this regard, different areas of the fingertip are likely illuminated differently such that one portion of the fingertip may appear to be brighter than another portion. Such varying light conditions across the surface of the finger can have an adverse effect on contrast. In one exemplary embodiment, the image processing logic 21 is configured to compensate for effects of varying light conditions by performing localized normalization on the fingerprint image 52.

In this regard, "global normalization" refers to a normalization process in which a set of normalization parameters, such as standard deviation and mean, are calculated based on all of the pixels of an image, and all of the pixels are normalized based on these normalization parameters. In "localized normalization," as that term is used herein, an image is segmented into multiple windows, wherein each window includes a subset of the pixels of the entire image. In some embodiments, the windows are overlapping such that the pixels close to an edge of one window are also included in an adjacent window, but it is unnecessary for the windows to be overlapping in other embodiments. Rather than calculating a single set of normalization parameters for the entire image, a different set of normalization parameters is calculated for each window based on the pixel values in the respective window. Such normalization values are then used to adjust the pixel values on a window-by-window basis such that the pixel values in each window are separately normalized based on a different set of normalization parameters relative to the pixels of other windows.

Figure 4:
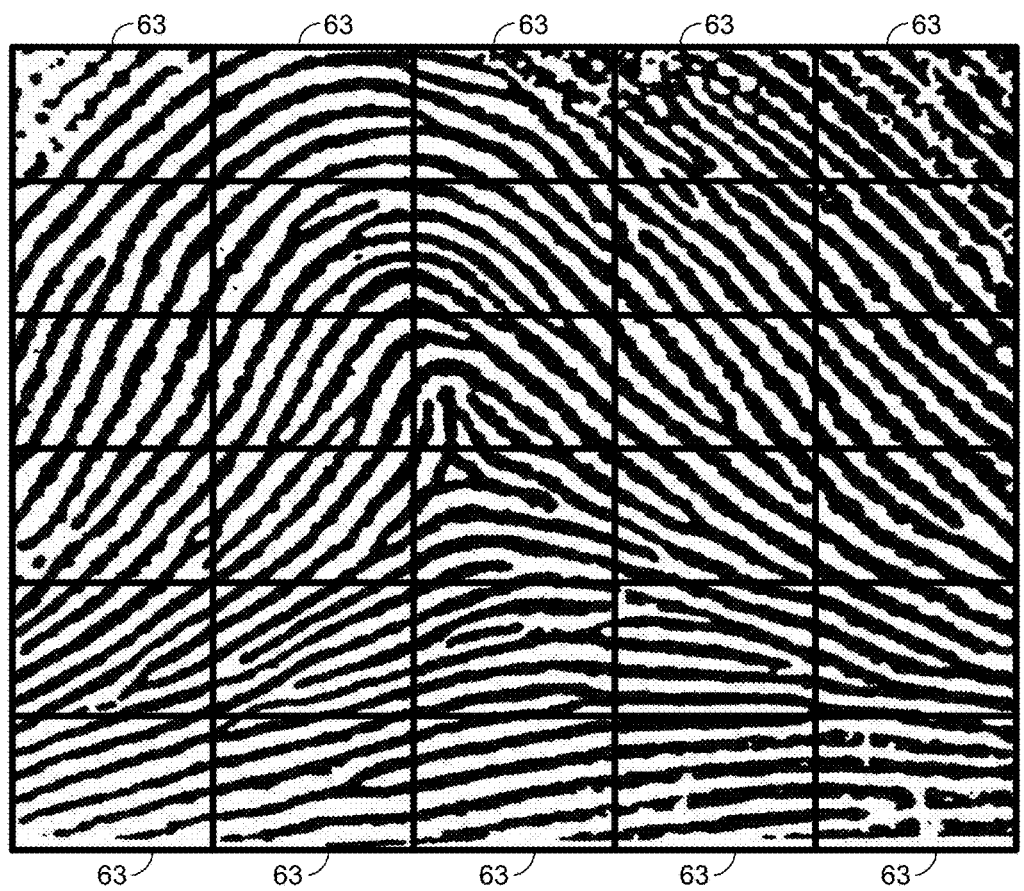
FIG. 4 depicts the fingerprint image of FIG. 2 after the fingerprint image has been segmented for localized normalization.

To better illustrate the foregoing, refer to FIG. 4. In this regard, the image processing logic 21 is configured to segment the fingerprint image 52 into a plurality of windows 63. For each window 63, the image processing logic 21 is configured to calculate a new set of normalization parameters, such as a standard deviation value and a mean value, based on the intensity values of the pixels within the window 63. After calculating such normalization parameters, the image processing logic 21 then adjusts the intensity values of the pixels in the same window 63 according to the normalization parameters. As an example, in one exemplary embodiment, for each intensity value in the same window 63, the image processing logic 21 is configured to subtract such intensity value by the window's mean value and divide such difference by the window's standard deviation value. Note that, in other embodiments, other normalization algorithms and parameters may be used.

Accordingly, the intensity values in each window 63 are normalized based on the normalization parameters that are uniquely calculated for such window 63. After normalizing a given window 63, the image processing logic 21 is configured to normalize the next window 63 in the same way using normalization parameters that are calculated from the intensity values in such next window 63. The normalization process is repeated for each window 63 until all of the windows 63 in the image 52 have been normalized.

By using a localized normalization algorithm, it is more likely that the intensity values that are normalized together (i.e., based on the same normalization parameters) represent an area of the user's finger that is illuminated with a similar brightness across the width of the area. That is, the lighting conditions are likely to vary less across the width of a smaller window 63 relative to the width across the entire image 52. Thus, the localized normalization algorithm is likely more effective at enhancing the contrast within the image 52 relative to a global normalization algorithm. In other embodiments, it is unnecessary to perform normalization, and it is possible to perform other types of normalization, if desired.

After normalization, the image processing logic is configured to perform filtering and other image enhancement techniques in an effort to reduce distortions or noise within the image 52. In one exemplary embodiment, the image processing logic 21 is configured to analyze each window 63 in order to determine parameters, referred to hereafter as "flow parameters," indicative of a flow pattern of the fingerprint ridges and valleys within the window 63. Using such flow parameters, the image processing logic 21 regenerates the window 63 such that the newly-generated window is free of the distortions and noise in the original image 52. That is, after generating the flow parameters based on the pixel values of the window 63, the image processing logic 21 uses the flow parameters, not the pixel values, to generate a new image of the window 63. Since the new window 63 is not based directly on the pixel values from the original image 52, the new window 63 should not contain the distortions or noise in the original image 52. By newly generating each window 63 in a similar manner, an entirely new image 52 is generated that should be free of the distortions and noise in the original image 52, thereby enhancing the quality of the image 52 that is used by the authentication logic 22, as will be described in more detail hereafter.

Various types of flow parameters may be used by the image processing logic 21. In one exemplary embodiment, the size of the windows 63 are selected to be small enough such that it can be assumed that the ridges and valleys flow in a single direction without introducing significant error into the image processing. Further, for each window 63, the image processing logic 21 is configured to estimate the angular direction that the ridges or valleys are extending, and the frequency of the ridges or valleys (e.g., the number of ridges that occurs over a unit of distance), noting that the angular direction and frequency of the ridges should be about the same as the angular direction and frequency of the valleys.

Thus, in one exemplary embodiment, the flow parameters of a given window 63 include a value indicative of the angular direction of the ridges or valleys and a value indicative of the frequency at which the ridges or valleys occur within the window. Based on such values, the image processing logic 21 is configured to generate a new window 63 having a flow pattern that resembles the flow pattern of the original window 63.

In generating the new window 63, it is assumed that the distance between consecutive ridges is the same and that the distance between consecutive valleys is the same. It is further assumed that the width of each ridge and valley is about the same. Using such assumptions, it is possible to generate an image of the window 63 based solely on the window's angular direction and frequency. Note that a window 63 having a higher frequency value should have a higher number of ridges that are spaced closer together relative to ridges of a window having a lower frequency value. Further, each of the ridges is assumed to travel in the same direction, as indicated by the window's angular value estimated by the image processing logic 21.

To facilitate the processing for analyzing the windows 63 and generating new windows 63, the image processing logic 21 is configured to apply a fast Fourier transform (FFT) function on the pixel data defining the window 63 in order to convert the pixel data into the frequency domain in order to facilitate estimation of the angular direction and frequency of the ridges or valleys. In the frequency domain, the pixel data is represented in polar coordinates.

Note that during this enhancement process, the image processing logic 21 is configured to perform filtering on the data in an effort to further suppress distortions and noise. For example, after converting the pixel data to the frequency domain, the image processing logic 21 is configured to apply a Butterworth filter or other type of filter to the pixel data.

Also note that the size of the windows 63 is a design parameter that affects performance and image quality. In this regard, smaller-sized windows 63 generally increase the processing burden of the device 10, yet it is generally desirable for the windows 63 to be sufficiently small to overcome various problems that could adversely affect image quality. In this regard, as described above, the windows 63 should be sufficiently small so that it can be assumed that the ridges and valleys of the same window generally flow in the same direction without introducing significant distortion or artifacts. As known in the art, a "bifurcation" generally refers to a region where a ridge or valley bifurcates or, in other words, where a single ridge or valley separates into two ridges or two valleys, respectively. If the size of the windows 63 is too large, some bifurcations may be lost when a new window 63 is generated. By using sufficiently small windows, many of the bifurcations will be automatically preserved such that they appear in the new windows 63 that are generated based on the exemplary flow parameters described. For an image 52 having a pixel density of 500 pixels per inch (ppi), it has been found that segmenting the image 52 into windows 63 of 32 pixels by 32 pixels is sufficient for suitable preservation of bifurcations, though other window sizes are possible.

After performing image enhancement, as described above, the image processing logic 21 is configured to extract feature descriptors from the image 52 and store such feature descriptors in memory 26 as the template 50 that is to be later used for authenticating fingerprint images captured by the device 10, as will be described in more detail below. Note that there are various algorithms that can be used to extract feature descriptors. For example, there are various conventional fingerprint authentication algorithms that detect fingerprint features, commonly referred to as "minutiae," and use such minutia in comparisons between fingerprint images for determining whether one image matches another. Such algorithms and/or other known fingerprint comparison algorithms may be employed by the image processing logic 21 for determining the feature descriptors, which in this embodiment describe the minutiae detected for the fingerprint image 52.

In one exemplary embodiment, the image processing logic 21 is configured to use a key point detection algorithm in order to detect key points within the fingerprint image 52. A key point detection algorithm generally analyzes the intensity values of an image to detect points of features within the image. In this regard, a "key point" generally refers to a point in the image where the intensity value abruptly changes relative to other points in the immediate vicinity or close to the key point. That is, a key point generally refers to a point where the change in intensity from neighboring points is greater than a predefined threshold indicating that a boundary of a corner or some other feature is likely located at or close to the key point. Such key point algorithms in the past have been used for finding key points in overlapping images so that the images can be stitched together, such as when taking a panoramic image of a scene.

Figure 5:
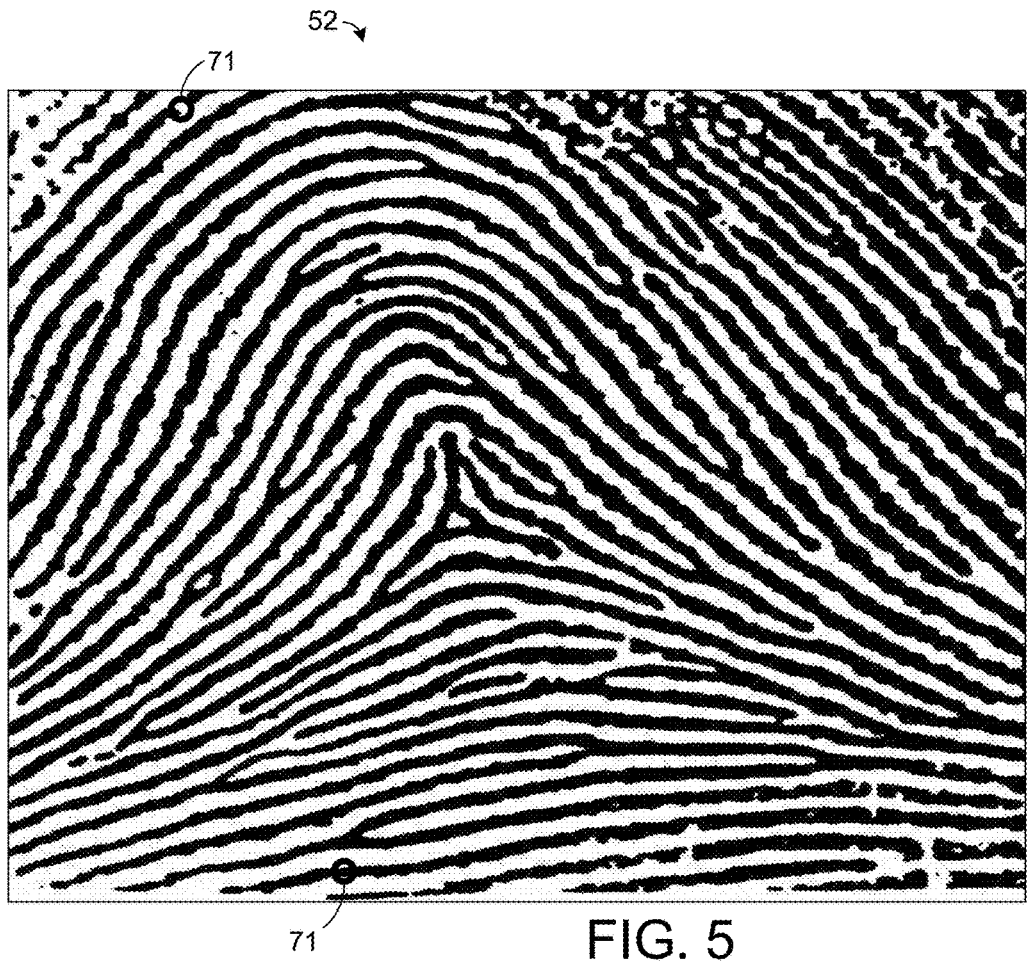
FIG. 5 depicts the fingerprint image of FIG. 2 with key points indicated in the fingerprint image for illustrative purposes.

In the instant embodiment, such a key point detection algorithm, such as the Features from Accelerated Segment Test (FAST) corner detection method, is used to locate key points 71 within the image 52, as shown by FIG. 5. Note that FIG. 5 shows two key points 71 for simplicity of illustration. However, in a given fingerprint image 52, the image processing logic 21 may locate any number, such as several thousand, of key points 71 depending on intensity patterns in the image 52.

Figure 6:
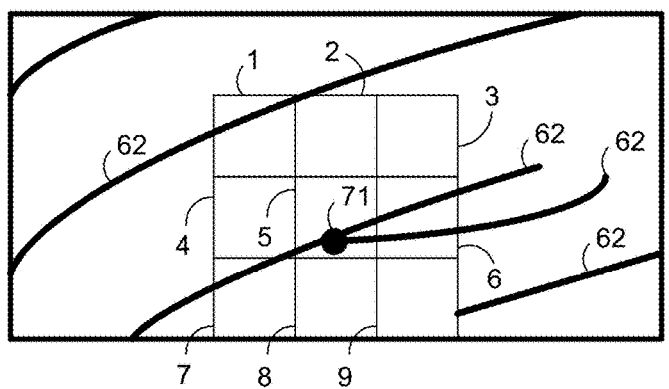
FIG. 6 depicts a portion of a fingerprint image, such as is depicted by FIG. 5, having a key point and, for illustrative purposes, shows pixels that are used for characterizing the key point.

For each identified key point 71, the image processing logic 21 is configured to characterize the key point 71 by defining a data structure (e.g., an array), referred to as a "feature descriptor," indicative of pixel values close to the key point. In one exemplary embodiment, the feature descriptor includes intensity values from adjacent pixels surrounding the key point 71. As an example, a key point 71 in FIG. 6 is shown as surrounded by nine adjacent pixels 1-9 representing a small window of pixels, wherein the window includes the location of the key point. The feature descriptor for such key point may have nine intensity values (i.e., one intensity value for each pixel 1-9). In one exemplary embodiment, the number of adjacent pixels used to characterize each key point 71 is selected between 5 and 15, although other numbers of pixels may be used to characterize a key point 71 in other embodiments. The feature descriptors of the identified key points 71 are stored in memory 26 as the template 50. In one exemplary embodiment, the feature descriptors are computed using the Oriented Binary Robust Independent Elementary Features ("Oriented BRIEF") method.

At this point, the fingerprint image 52 may be discarded. Thus, it is not necessary for the fingerprint image 52 to be permanently stored in memory 26 to enable authentication. That is, the feature descriptors may be used to authenticate fingerprint images without the need to retain an actual fingerprint image 52 in memory 26. This helps to prevent unauthorized access to the user's fingerprint image 52 in the event that an unauthorized user somehow gains access to the device 10.

After the template 50 has been defined, fingerprint authentication may be performed as may be desired. In this regard, when user authentication is desired, the image capture logic 20 is configured to capture an image 52 of a user's fingerprint via the camera 42, as described above and shown by block 111 of FIG. 7. Further, this fingerprint image 52 is processed in the same way as described above in order to extract feature descriptors from the fingerprint image 52. As an example, the image processing logic 21 is configured to perform a localized normalization on the captured fingerprint image, as described above and shown by block 115 of FIG. 7, thereby enhancing contrast within the fingerprint image. The logic 21 then regenerates the image 52, as shown by block 117 of FIG. 7. In this regard, for each local window of the image 52, the logic 21 estimates flow parameters and uses such flow parameters to generate a new image 52 that resembles the one captured by the camera 42, as described above. From this regenerated image 52, the image processing logic 21 extracts feature information, such as the feature descriptors described above, as shown by block 118 of FIG. 7, by identifying key points in the fingerprint image and then characterizing each identified key point with an array of intensity values representing the adjacent pixels surrounding the identified key point. Such feature descriptors for the same fingerprint image are stored in memory 26 as a set of key point data 77.

Figure 7:
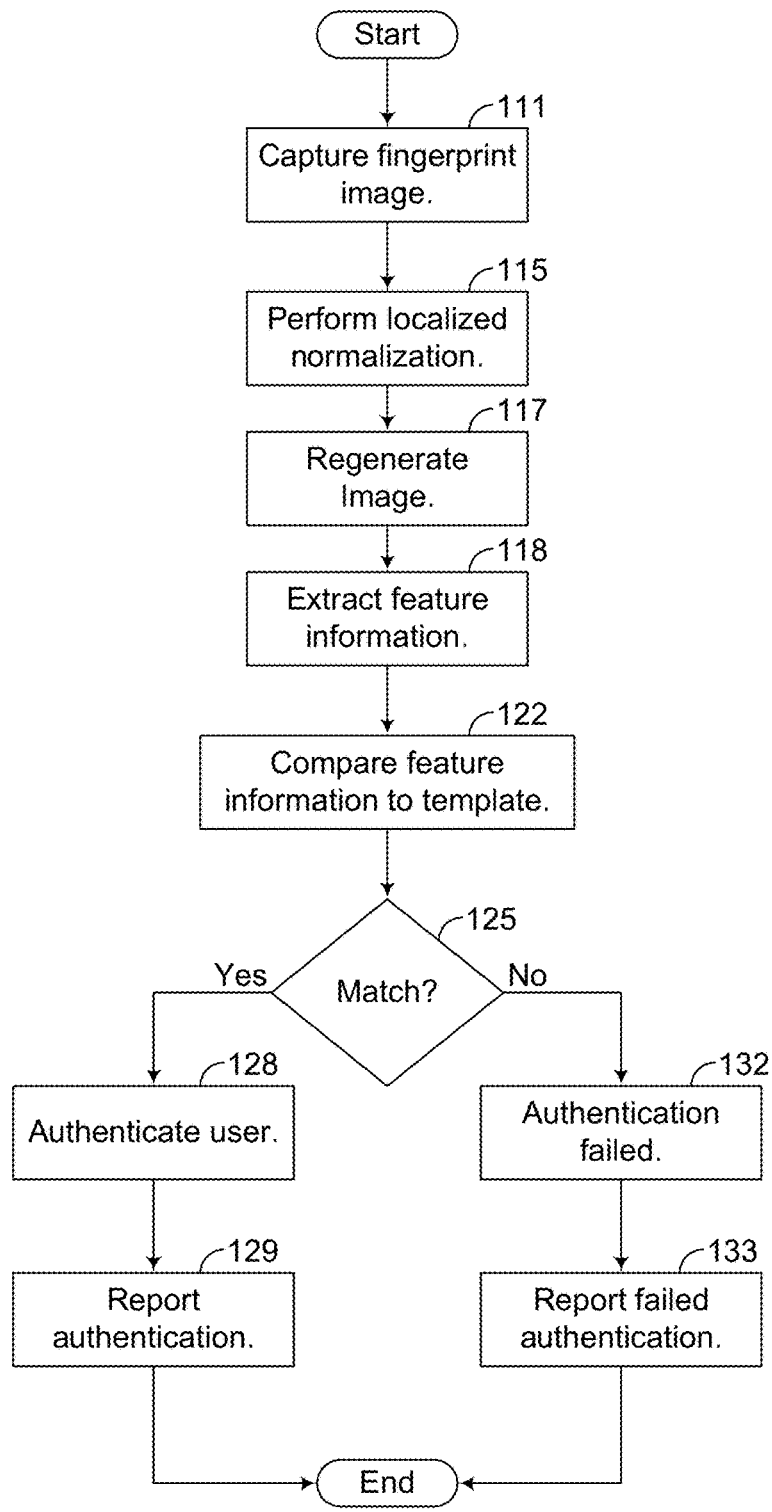
FIG. 7 is a flowchart illustrating an exemplary method for authenticating a user of an electronic device, such as is depicted by FIG. 1.

After the key point data 77 is defined, the authentication logic 22 is configured to compare the key point data 77 (specifically the feature descriptors extracted in block 118) to the template 50 to determine whether the key point data 77 matches the template 50, as shown by blocks 122 and 125 of FIG. 7. That is, the logic 22 compares each feature descriptor of the key point data 77 to the feature descriptors of the template 50 to determine which of the feature descriptors of the key point data 77 match a respective feature descriptor of the template 50. A feature descriptor is deemed to match another feature descriptor if the difference in the intensity values of the two vectors is below a predefined threshold. In one exemplary embodiment, each feature descriptor is treated as a distance vector, where each intensity value represents a component of the distance vector, and the Hamming distance between the feature descriptors is calculated and compared to a threshold. If the Hamming distance is below a predefined threshold, then the feature descriptors are determined to match. If not, no match is detected.

In one exemplary embodiment, the authentication logic 22 is configured to calculate a correlation score by counting the number of feature descriptors in the key point data 77 that are determined to match feature descriptors in the template 50. Thus, a higher number of descriptor matches results in a higher correlation score. If the correlation score exceeds a predefined threshold, then the newly-acquired fingerprint image is deemed to match the original fingerprint image from which the template 50 was derived. In such case, the authentication logic 22 is configured to authenticate the user and report the authentication to the operating system 12 or other component, as shown by blocks 128 and 129 of FIG.

7. As an example, the logic 22 may transmit a message to the operating system 12 indicating that a match was found for the newly-acquired fingerprint image. In response, the operating system 12 may permit the user to provide inputs for accessing resources of the device 10 that would otherwise be restricted from access. In addition, the authentication logic 22 is also configured to display, via the output interface 38, a message indicating the authentication attempt was successful.

If the correlation score does not exceed the predefined threshold, then the authentication logic 22 is configured to determine that the authentication failed and to report the failed authentication attempt, as shown by blocks 132 and 133 of FIG. 7. As an example, the logic 22 may transit a message to the operating system 12 indicating that a match was not found for the newly-acquired fingerprint image. In response, the operating system 12 may prevent the user from accessing one or more resources of the electronic device 10, such as applications or sensitive data stored in the device 10, until an authentication attempt is successfully performed. In addition, the authentication logic 22 is also configured to display, via the output interface 38, a message indicating that the authentication attempt was not successful.

Note that the use of a key point detection algorithm, as described above, to extract feature descriptors from the fingerprint images may have advantages for touchless fingerprint algorithms relative to other types of feature extraction algorithms. In this regard, the key point detection algorithm can yield a successful matching decision, according to the matching techniques described herein, even when the user's finger is significantly rotated in the fingerprint image being authenticated relative to the original fingerprint image used to define the template 50. When the user's finger is so rotated, a portion of the user's fingerprint may be missing from the fingerprint image 52 that is being compared to the template 50. For key points in the missing portion of the fingerprint image, there will be no matches. However, as long as there is at least a portion of the fingerprint image 52 corresponding to a portion of the original fingerprint image from which the template 50 was derived, there should be at least some key point matches counted by the authentication logic 22. In such case there may be enough key point matches to reliably authenticate the user even though the user's finger is significantly rotated.

As described above, in touchless fingerprint authentication, the depth of field from one image to the next may be different thereby increasing the complexity of matching the template 50 to a captured image 52. In one exemplary embodiment, the authentication logic 22 is configured to perform pyramid scaling on the template 50 in an effort to alleviate matching problems that may arise from capturing an image of an unknown depth of field. In this regard, as described above, a fingerprint image 52 is captured and processed during registration in order to define a template 50 for use in authenticating the user in the future. Before discarding the image 52, the authentication logic 22 is configured to scale the image 52 by increasing or decreasing the size of the image 52.

As an example, to decrease the size of the image 52, the authentication logic 22 may remove a number of columns and rows of the array of pixel data defining the image 52. For each removed pixel, the authentication logic 22 may combine (e.g., average) the removed pixel value with at least one adjacent pixel such that the removed pixel is effectively "blurred" with another pixel. In one exemplary embodiment, the authentication logic 22 applies a Gaussian function to the intensity value of the removed pixel and the intensity values of the adjacent pixel values in order to determine new intensity values for the adjacent pixels. Such techniques for reducing the scale of an image 52 are generally well known.

To increase the size of the image 52, the authentication logic 22 may add a number of columns and rows to the array of pixel data defining the image 52. For each added pixel, the authentication logic 22 may combine (e.g., average) multiple intensity values from adjacent pixels to determine the pixel value for the added pixel. In one exemplary embodiment, the authentication logic 22 applies a Gaussian function to the intensity values of the adjacent pixels in order to determine the new intensity value for the added pixel. Such techniques for increasing the scale of an image 52 are generally well known.

Note that each newly-scaled image represents an estimate of the image of the user's fingerprint at a different depth of field. In this regard, if the image 52 is scaled to a larger image, then the larger image should be similar to an image of the same fingerprint captured at a smaller depth of field (i.e., when the user's finger is closer to the camera lens). Conversely, if the image 52 is scaled to a smaller image, then the smaller image should be similar to an image of the same fingerprint captured at a greater depth of field (i.e., when the user's finger is further from the camera lens).

For each scaled image generated, the authentication logic 22 is configured to extract feature descriptors from the newly-scaled image in order to define a template 50 for this newly-scaled image according to the techniques described above. Thus, the authentication logic 22 is configured to generate multiple templates 50 in which each template 50 corresponds to a restive one of the scaled images. That is, each template 50 defines the feature descriptors for an image of the user's finger when at a different depth of field relative to those of the other templates 50. Subsequently, when an image 52 is processed for authentication, the image 52 is compared to each of the templates 50, according to the techniques described above. Thus, it is likely that the image 52 is compared to a template 50 corresponding to a depth of field similar to the depth of field for the processed image 52. If the image 52 matches any of the templates 50, then the user is authenticated.

Accordingly, the user's finger may be located at any of various depths of field during image capture with the resulting image 52 compared to at least one template 50 corresponding to a substantially similar depth of field relative to that for the image 52. Therefore, the authentication logic 22 is more likely to find a match regardless of the image's actual depth of field.

In various embodiments described by U.S. Provisional Patent Application No. 61/930,832, image capture is facilitated using a graphical alignment element that is displayed via the output interface 38. Specifically, the graphical alignment element is superimposed on the image of the user's finger in order to provide a reference for aligning the user's finger with the lens of the camera 42. As described by U.S. Patent Application No. 61/930,832, the graphical alignment element may be an ellipse, but other types of graphical alignment elements may be used in other embodiments.

In one exemplary embodiment, the image capture logic 20 is configured to dynamically size the graphical alignment element based on the image 44 of the user's finger in an effort to provide optimal and more consistent image quality from one capture to the next. In this regard, during registration, the image capture logic 20 is configured to display the graphical alignment element at one size and to then perform an image capture operation according to the techniques described above. The image capture logic 20 is configured to then change the size of the graphical alignment element and to perform another image capture. As an example, if the graphical alignment element is an ellipse, the image capture logic 20 increases or decreases the circumference of the ellipse for the next image capture operation. This process of changing the size of the graphical alignment element and then capturing an image is repeated until a certain number of image captures have been successfully performed.

After capturing a plurality of fingerprint images, the image capture logic 20 is configured to analyze and compare the quality of each image to determine which fingerprint image has the highest quality. As an example, the image capture logic 20 may compare the contrast values of the captured images to determine which image has the highest contrast value. In other embodiments, other techniques for identifying the highest quality image are possible.

After finding the image of the highest quality, the image capture logic 20 is configured to store control data indicative of the size of the graphical alignment element that was used for the identified image. Such data is sufficient for enabling the image capture logic 20 to display the same graphical alignment element of the same size for future image captures. As an example, if the graphical alignment element is an ellipse, the image capture logic 20 may store control data indicative of the width and length of the ellipse. Thereafter, when the image capture logic 20 performs an image capture operation, the logic 20 uses the control data in order to display the graphical alignment element so that it is sized according to the graphical alignment element that resulted in the highest quality image during registration. That is, the graphical alignment element displayed on a going-forward basis has the same size as the graphical alignment element used to capture the highest quality image during registration. Using a graphical alignment element sized in such manner encourages the user to place his finger at an optimal depth of field for capturing a high-quality fingerprint image.

In some embodiments, it may be desirable to mount the device 10 on a structure, such as a wall of a building. As an example, the device 10 may be mounted on a wall next to a door and thereafter used to control access to a room through the door. In this regard, the device 10 may be coupled to a door lock and configured to control the door lock based on the user authentication techniques described herein. Specifically, the device 10 stores templates 50 of users who are authorized to access the room. When a user approaches the door for entry into the room, the user may place his finger in front of the lens of the camera 42 so that the an image of the user's fingerprint can be captured and compared to the templates 50 to determine whether the user is authorized to enter the room. If the user's fingerprint image matches any of the predefined templates 50, the device 10 recognizes the user as being authorized to enter the room and, therefore, temporarily unlocks the door so that the user may open the door and enter the room. However, if the user's fingerprint image does not match any of the predefined templates 50, the device 10 does not authenticate the user and, therefore, does not unlock the door.

One problem that can be encountered is that the hardware of many conventional electronic devices, such as cellular telephones or tablet computers, may have the camera lens and the output interface located on opposite sides. For such a configuration, either the lens or the output interface is hidden when the device is mounted on a wall. The device could be arranged so that the lens of the camera faces outward so that the user can place his finger in front of the camera lens. However, in such case, the user will be unable to see the output interface and thus unable to receive visual cues that can help to align his finger with the camera lens at an optimal depth of field.

Figure 8:
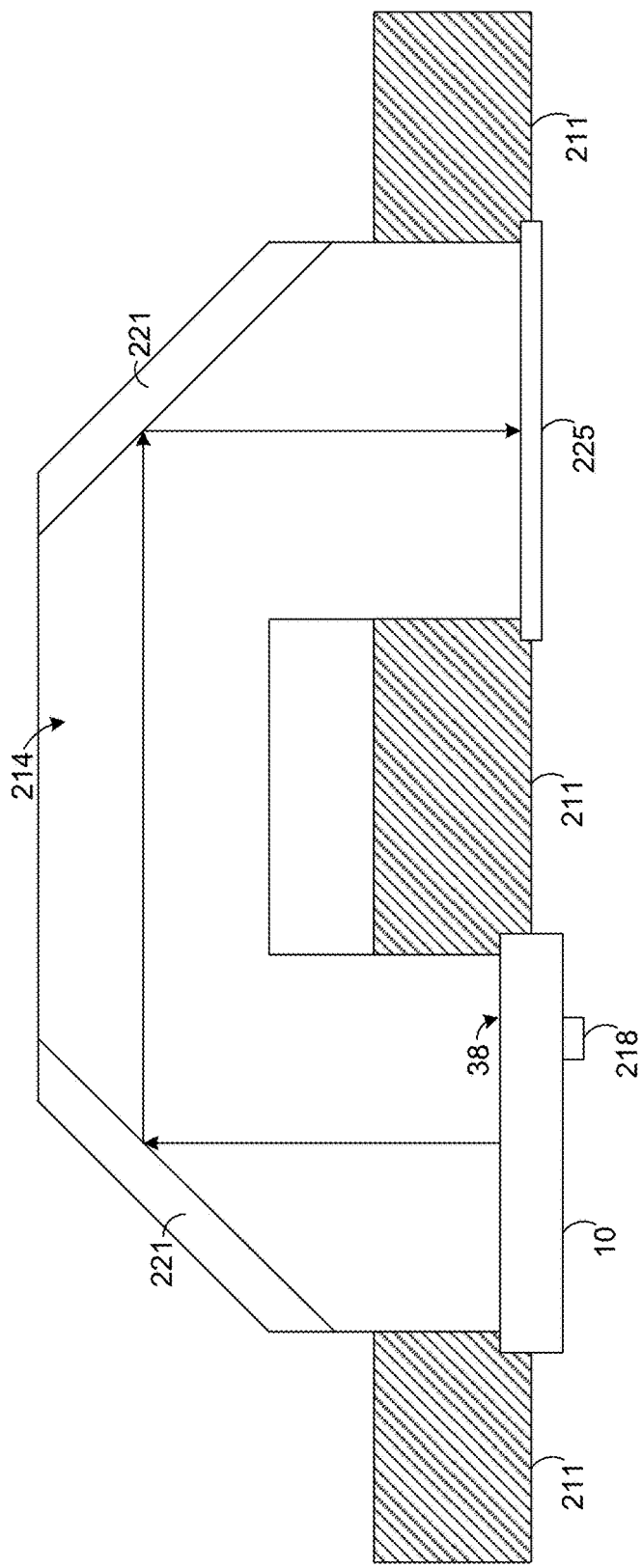
FIG. 8 is a top view illustrating an exemplary embodiment of a system for authenticating users.

In one exemplary embodiment, as shown by FIG. 8, an electronic device 10 is mounted on a wall 211 of a building and used to perform fingerprint authentication according to the techniques described herein. As shown by FIG. 8, the lens 218 of a camera 42 and output interface 38 are located on opposite sides of the device 10. The building has a passageway 214 that passes through the wall 211 and is aligned with the electronic device 10 and, more specifically, the output interface 38. In this regard, the output interface 38 is located on a side of the device 10 that faces passageway 214 such that an image from the output interface 38 is received by and passes through the passageway 214. The lens 218 of the camera 42 is located on an opposite side of the device 10 so that the lens 218 generally faces away from the wall 211.

Within the passageway 214 is a plurality of mirrors 221, 222 for reflecting light from the output interface 38, as will be described in more detail below. In the exemplary embodiment shown by FIG. 8, there are two mirrors 221, 222, but there may be any number of mirrors in other embodiments. Also mounted on the wall 211 at an end of the passageway 214 is a transparent element 225, such as glass. The mirrors 221, 222 are positioned such that light from the output interface 38 is directed toward and reflects from the mirrors 221, 222 toward the transparent element 225. Specifically, light from the output interface 38 is reflected from the mirror 221 toward the mirror 222. The light also reflects from the mirror 222 toward the transparent element 225, which permits the light to pass. Thus, a user standing in front of the device 10 can see the image displayed by the output interface 38 through the transparent element 225.

During image capture, a user places his finger in front of the lens 218 so that the camera 42 receives an image of the user's finger. As described above, the image capture logic 20 controls the camera 42 and the device 10 such that a video feed from the camera 42 is rendered via the output interface 38 in order to facilitate alignment of the user's finger with the lens 218. Thus, the output interface 38 displays an image of the user's finger. As described above, a graphical alignment element may be superimposed on the image in order to facilitate finger alignment, including achieving a desired depth of field. The image reflects from the mirrors 221, 222 and is visible to the user through the transparent element 225. Thus, by looking at the transparent element 225, which is positioned adjacent to the device 10 in close proximity thereto, the user can determine how to position his finger relative to the lens 218 in order to achieve capture of a high quality image for fingerprint authentication.

Figure 9:
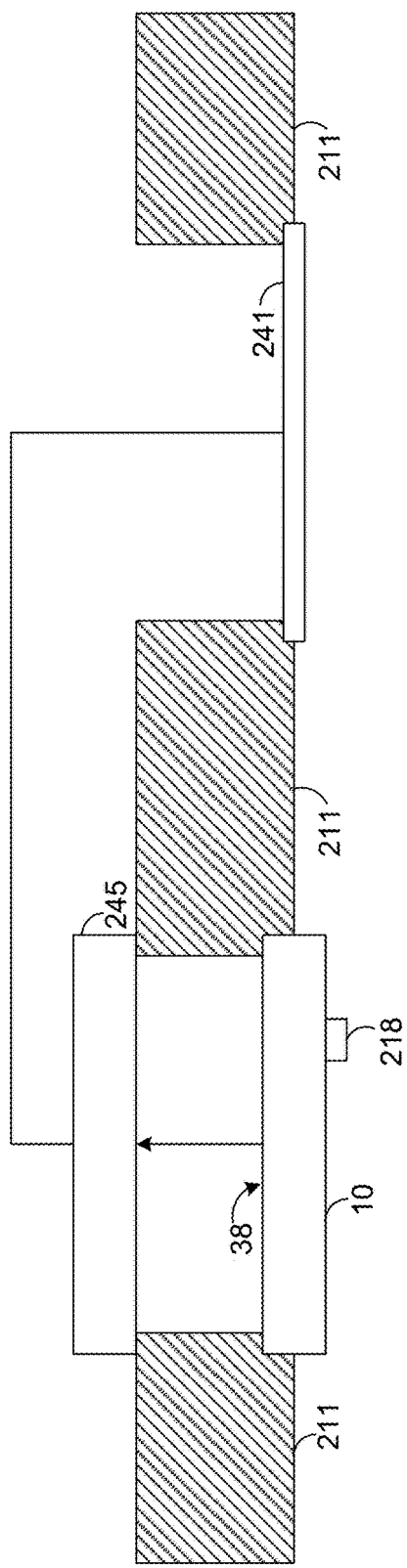
FIG. 9 is a top view illustrating an exemplary embodiment of a system for authenticating users.

In other embodiments, other techniques for transferring the image produced by the output interface 38 for viewing by the user are possible. As an example, FIG. 9 depicts an exemplary embodiment in which the image is electronically transmitted to another output interface 241, such as an LCD or other type of display device. In this regard, a camera 245 is positioned within the wall 211 or other location for receiving the image displayed by the output interface 38 of the device 10. The camera 245 electrically coupled to the output interface 241 and is configured to convert the image from the device 10 to data. The camera 245 is further configured to transit the data to the output interface 241, which is configured to render the data so that the user can see the image displayed by the output interface 38. In another exemplary embodiment, the output interface 241 is coupled directly to the device 10 via at least one conductive wire, and the device 38 is configured to transmit data defining the video feed from the camera 42 to the output interface 241 such that it is unnecessary for the output interface 38 to render the video feed. In yet another exemplary embodiment, such data is wirelessly transmitted to the output interface 241.

Now, therefore, the following is claimed:

1. A mobile communication device for performing touchless fingerprint authentication, comprising:
   memory for storing a plurality of templates indicative of images of a fingerprint at different depths of field, each of the templates defining feature descriptors for a plurality of key points within one of the images of the fingerprint at a respective depth of field;
   a camera; and
   at least one processor programmed to control the camera to capture an image of a fingerprint, the at least one processor further programmed to extract key point data from the captured image by identifying a plurality of key points in the captured image and characterizing each of the plurality of key points in the captured image with a respective feature descriptor that includes a plurality of intensity values for adjacent pixels around the key point being characterized, the at least one processor further programmed to perform comparisons between the feature descriptors characterizing the plurality of key points in the captured image and feature descriptors for each of the templates and to authenticate a user for accessing a resource of the mobile communication device based on the comparisons.

2. The mobile communication device of claim 1, wherein the at least one processor is further programmed to perform localized normalization on the captured image before extracting the key point data from the captured image.

3. The mobile communication device of claim 1, wherein the at least one processor is configured to determine which of the feature descriptors characterizing the plurality of key points in the captured image match at least one of the feature descriptors for one of the templates.

4. The mobile communication device of claim 3, wherein the at least one processor is configured to determine a correlation score based on a number of the feature descriptors characterizing the plurality of key points in the captured image that match at least one of the feature descriptors for the one template, and wherein the at least one processor is configured to compare the correlation score to a threshold.

5. A method for use with a mobile communication device to perform touchless fingerprint authentication, comprising:
   storing, in memory, a plurality of templates indicative of images of a fingerprint at different depths of field, each of the templates defining feature descriptors for a plurality of key points within one of the images of the fingerprint at a respective depth of field;
   capturing an image of a fingerprint with a camera;
   identifying with at least one processor a plurality of key points in the captured image;
   characterizing with the at least one processor each of the plurality of key points in the captured image with a feature descriptor that includes a plurality of intensity values for adjacent pixels around the key point being characterized;
   comparing with the at least one processor the feature descriptors characterizing the plurality of key points in the captured image to feature descriptors for each of the templates; and
   authenticating a user of the mobile communication device based on the comparing.

6. The method of claim 5, further comprising performing localized normalization on the captured image prior to the defining.

7. The method of claim 5, further comprising:
   analyzing a plurality of frames of a video feed from the camera with the at least one processor;
   for each of the frames, determining a value indicative of a focus of an image defined by the respective frame; and
   selecting one of the plurality of frames from the video feed for comparison to the templates based on the value indicative of the focus for the selected frame, wherein the selected frame defines the captured image.

8. The method of claim 7, further comprising:
   displaying the video feed with an output interface of the mobile communication device; and
   displaying within the video feed a graphical alignment element; and
   aligning a user's finger with the camera based on the graphical alignment element.

9. The method of claim 8, further comprising performing localized normalization on the captured image, the performing localized normalization comprising:
   determining a first normalization parameter for a first window of the captured image based on intensity values within the first window;
   determining a second normalization parameter for a second window of the captured image based on intensity values within the second window;
   adjusting the intensity values within the first window based on the first normalization parameter; and
   adjusting the intensity values within the second window based on the second normalization parameter.

10. The mobile communication device of claim 1, wherein the at least one processor is configured to analyze a plurality of frames of a video feed from the camera and, for each of the plurality of frames, determine a value indicative of a focus of an image defined by the respective frame, wherein the at least one processor is configured to select one of the frames from the video feed for comparison to the templates based on the value indicative of the focus for the selected frame, and wherein the selected frame defines the captured image.

11. The mobile communication device of claim 10, further comprising an output interface, wherein the at least one processor is configured to display the video feed via the output interface and to display within the video feed a graphical alignment element for aligning a user's finger with the camera.

12. The mobile communication device of claim 11, wherein the at least one processor is configured to perform localized normalization on the captured image before extracting the key point data by: (1) segmenting the captured image into a plurality of windows, including at least a first window and a second window, (2) determining a first normalization parameter based on intensity values within the first window, (3) determining a second normalization parameter based on intensity values within the second window, (4) adjusting the intensity values within the first window based on the first normalization parameter, and (5) adjusting the intensity values within the second window based on the second normalization parameter.

* * * * *